(12) United States Patent
Loy

(10) Patent No.: US 9,193,528 B2
(45) Date of Patent: Nov. 24, 2015

(54) VIAL TRANSPORT MECHANISM

(71) Applicant: GRIFOLS WORLDWIDE OPERATIONS LIMITED, Dublin (IE)

(72) Inventor: Larry H. Loy, Raleigh, NC (US)

(73) Assignee: GRIFOLS WORLDWIDE OPERATIONS LIMITED, Dublin (IE)

( * ) Notice: Subject to any disclaimer, the term of this patent is extended or adjusted under 35 U.S.C. 154(b) by 15 days.

(21) Appl. No.: 14/250,034

(22) Filed: Apr. 10, 2014

(65) Prior Publication Data

US 2015/0291363 A1 Oct. 15, 2015

(51) Int. Cl.
*B65G 25/08* (2006.01)
*B65G 25/04* (2006.01)

(52) U.S. Cl.
CPC .............. *B65G 25/08* (2013.01); *B65G 25/04* (2013.01); *B65G 2201/0244* (2013.01)

(58) Field of Classification Search
CPC ................... B65G 25/04; B65G 25/08; B65G 2201/02444; B65G 2201/0244
USPC ................................. 198/736, 737, 747, 773
See application file for complete search history.

(56) References Cited

U.S. PATENT DOCUMENTS

| | | | | |
|---|---|---|---|---|
| 3,665,987 | A * | 5/1972 | Daugherty | 83/435.19 |
| 4,520,792 | A * | 6/1985 | Weber | 126/175 |
| 4,586,253 | A * | 5/1986 | Souchi et al. | 29/796 |
| 4,658,954 | A * | 4/1987 | Harlow | 198/774.1 |
| 8,543,453 | B1 * | 9/2013 | Calvert et al. | 705/14.43 |
| 2003/0205444 | A1 * | 11/2003 | Woodham | 198/463.6 |
| 2012/0217133 | A1 * | 8/2012 | Petryshen | 198/617 |
| 2012/0222941 | A1 * | 9/2012 | Liebhardt et al. | 198/750.11 |

* cited by examiner

*Primary Examiner* — Mark A Deuble
(74) *Attorney, Agent, or Firm* — Knobbe Martens Olson & Bear LLP

(57) ABSTRACT

A device for transferring a container from a first location to a second location includes a first container guide defining a linear path between the first location and the second location, a second container guide defining a second linear path between the first location and the second location, the second linear path having at least a change in path direction, and a motor unit creating a relative movement between the first guide and the second guide.

15 Claims, 8 Drawing Sheets

VIAL TRANSPORT MECHANISM

The present specification includes disclosure of a device for the transfer of containers from one location to another. More specifically, this disclosure relates to a transfer device whose unique properties allow for the transfer of containers, e.g. vials, from one location to another with different environmental classifications.

Container conveyors are used in many industries and generally use a conveyor belt that loops around two rollers, one roller at each end of the conveyor. In some installations that require segregation of two zones with environmental classifications, two conveyors meet at the interface zone and the containers must be pushed across a "dead plate" that separates the conveyor belts dedicated to their respective zones. This is the case, for example, of pharmaceutically filling lines where the filled containers are transferred from a higher environmental classification zone to a lower environmental classification zone. In this case, a continuous conveyor between zones cannot be utilized, since there should be no continuity between zones except for the containers being transferred. Containers in the dead plate are pushed by subsequent containers reaching the dead plate from the delivering conveyor. Pushed containers that have successfully gone along the dead plate are captured by the receiving conveyor due to friction. One problem with such prior art lies in that control is problematic at best.

In some embodiments, a device can replace the industry standard dead plate, allowing the transfer of components across a boundary with no other exchange across the boundary apart from the transferred component, and provides superior functionality.

In some embodiments, a device for the transfer of containers does not show the control problems described above, while providing a complete positive component control.

In some embodiments, a device provides for a dynamic linear bottle transport across a connecting zone with no mechanical linear motion in the direction of transfer.

In some embodiments, positive transport of containers across environmental classifications with no cross contamination potential, using a single powered apparatus is provided. The powered motion that transports the bottles in a given linear direction is perpendicular to the direction of travel of the containers.

An embodiment of the present invention consists of four parts. A fixed base, fixed lower and upper bottle guides, and a oscillating drive plate. In this preferred embodiment, the oscillating drive plate is the only drive part and has a cutout pattern defining a zigzag guide for the containers. The novel cutout pattern in combination with the oscillating movement imposes a linear pattern of movement to the bottles.

Preferred embodiments of the present invention inherently present additional advantages. In addition to positively transporting bottles or other round components across zones with no zone interchange, the present invention indexes the components in a controlled way that can permit use of the resulting individual position information and container spacing.

Also, this mechanism automatically establishes this bottle positioning even when bottles are choke-fed with no spacing into the unit. There is no need to control component feed.

Container transfer is accomplished in an inherently smooth manner when the cross-drive oscillation plate is driven with a sinusoidal velocity profile.

There is no limit to the length or distance that this mechanism can be used to transfer components. In addition to transferring components between zones, this device can be used for normal conveying of components wherever needed.

Many embodiments are especially adequate for round containers, such as bottles and/or vials, although it is not necessarily limited to this kind of containers.

An additional advantage of embodiments of the present invention is that they provide controlled container transportation and precise positioning without the use of recirculating belts, and can be applied to filling equipment, conveyor-to-conveyor transfers, and many applications where driven recirculating belts represent a liability.

More particularly, one embodiment comprises a device for transferring a container from a first location to a second location which comprises:

a first container guide defining a linear path between the first location and the second location a second container guide defining a second linear path between the first location and the second location, the second linear path having at least a change in path direction a motor unit creating a relative movement between the first guide and the second guide Preferably, the first container guide and the second container guide are located at different levels of the container to be transferred.

Also preferably, the second linear path crosses the first linear path at least once.

Preferably the first linear path is a straight linear path.

According to a preferred embodiment, the motor unit has a reciprocating device creating a reciprocating movement between the first and second guides, the reciprocating movement being perpendicular to the straight linear path.

Preferably, the second linear path is a zig zag path.

In preferred embodiments, the second linear path has a first path section perpendicular to first linear path, followed by a second path section oblique to the first linear path, the second path section followed by a third path section perpendicular to the first linear path, followed in turn by a fourth path section forming an angle different to zero to both the first linear path and the second path section.

Preferably, the first guide is fixed.

According to further preferred embodiments, the device has a third guide which is fixed to the first guide and follows the first linear path, the second guide being located between the first and third guides.

In preferred embodiments, the containers are rounded containers, for example, bottles and/or vials.

The device may further comprise two conveyors for moving a container up to the first location and from the second location away, the first location preferably belonging to a first zone with a first environmental classification and the second location belonging to a second zone with a second classification different to the first classification.

Preferably, the first path is perpendicular to the interface between the first and second zones and the movement between guides is parallel to said frontier.

In preferred embodiments, the second guide is formed by a second plate with a cutout which defines the second path, the plate having at least a bridge for joining both parts of the plate on each side of the cutout.

Preferably, the cutout is defined on each side by triangular teeth with rounded sections between them, the triangular teeth defining each a tooth apex, the tooth apexes on one side of the cutout being staggered in relation to the tooth apexes of the opposite side of the cutout.

Also in preferred embodiments, the first guide is formed by a first fixed plate with a cutout or groove that defines the first path.

Preferably, the first fixed plate has grooves or orifices for guiding the relative movement between the first fixed plate and the second plate.

More preferably, the motor unit has a motor connected to a reciprocating mechanism which is in turn rotatably connected to the second plate, so that the motor unit drives the second plate in a reciprocating movement.

Advantageously, the motor unit drives the second plate with a sinusoidal velocity profile.

BRIEF DESCRIPTION OF THE DRAWINGS

For a better understanding of embodiments of the present invention, the accompanying drawings show a device according to the present invention, as an explanatory and non-limiting example.

DETAILED DESCRIPTION OF THE PREFERRED EMBODIMENT

An example of an embodiment is disclosed herein, but this does not constitute a limitation.

Figure 1:
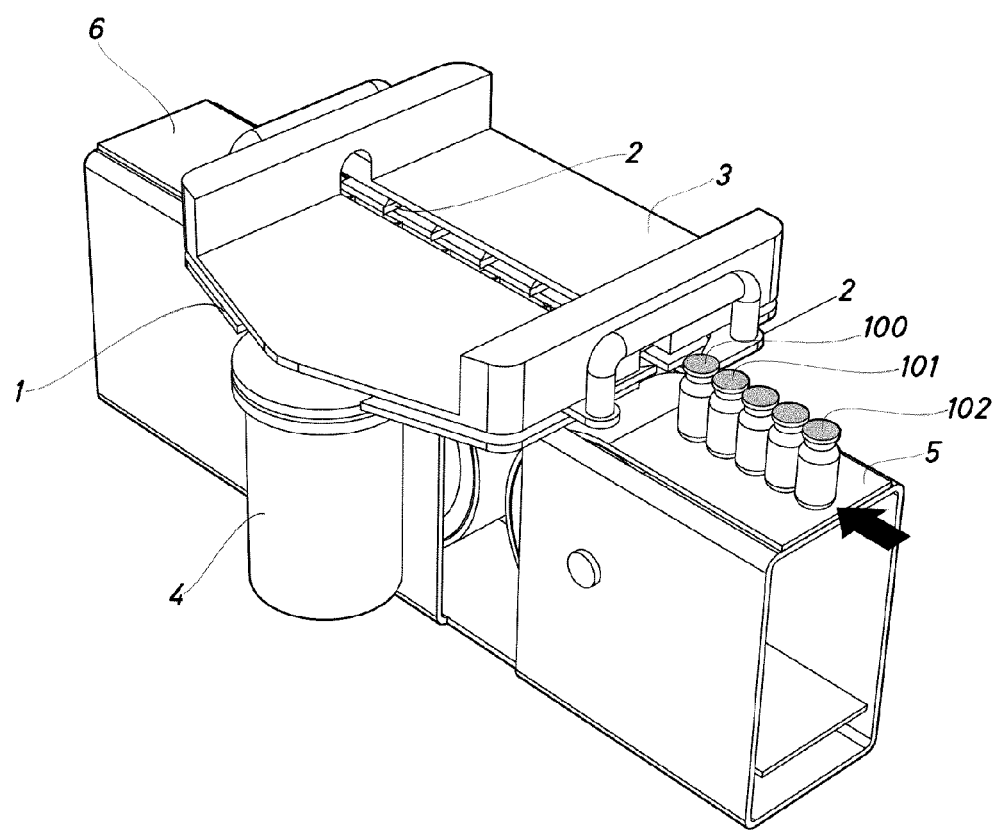
FIG. 1 shows a perspective view of a transfer device according to an embodiment of the present invention.

FIG. 1 shows a device for transferring rounded containers, in particular bottles 100,101,102 from a first conveyor belt 5 to a second conveyor belt 6. Typically, the bottles are bottles filled with a pharmaceutical product or substance, and the first conveyor belt 5 and the second conveyor belt 6 belong to two different zones with a different environmental classification each. In this case, the only elements going from one zone to another zone must be the bottles 100, 101, 102 alone.

The device shown in FIGS. 1-6 comprises three cutout plates 1, 2, 3 located at three different levels, one above or on top of the other. The lower, first plate 1 and the upper third plate 3 are fixed, while the intermediate second plate 2 can be driven by a motor unit according to a reciprocating movement which is perpendicular to the movement of the bottles, i.e. perpendicular to the interface between the two zones with different environmental classifications.

Each plate 1, 2, 3 has a cutout defining a linear path for the bottles, thus functioning as guides for the bottles. Both the first plate 3 and the third plate 1, which are fixed, define the same straight linear path between a first location and a second location. The second plate 2, which is driven by the motor unit 4, define a zigzag path that crosses several times the path defined by the first and second plates. A base supports the plates 1,2,3 and the motor unit 4.

Figure 2:
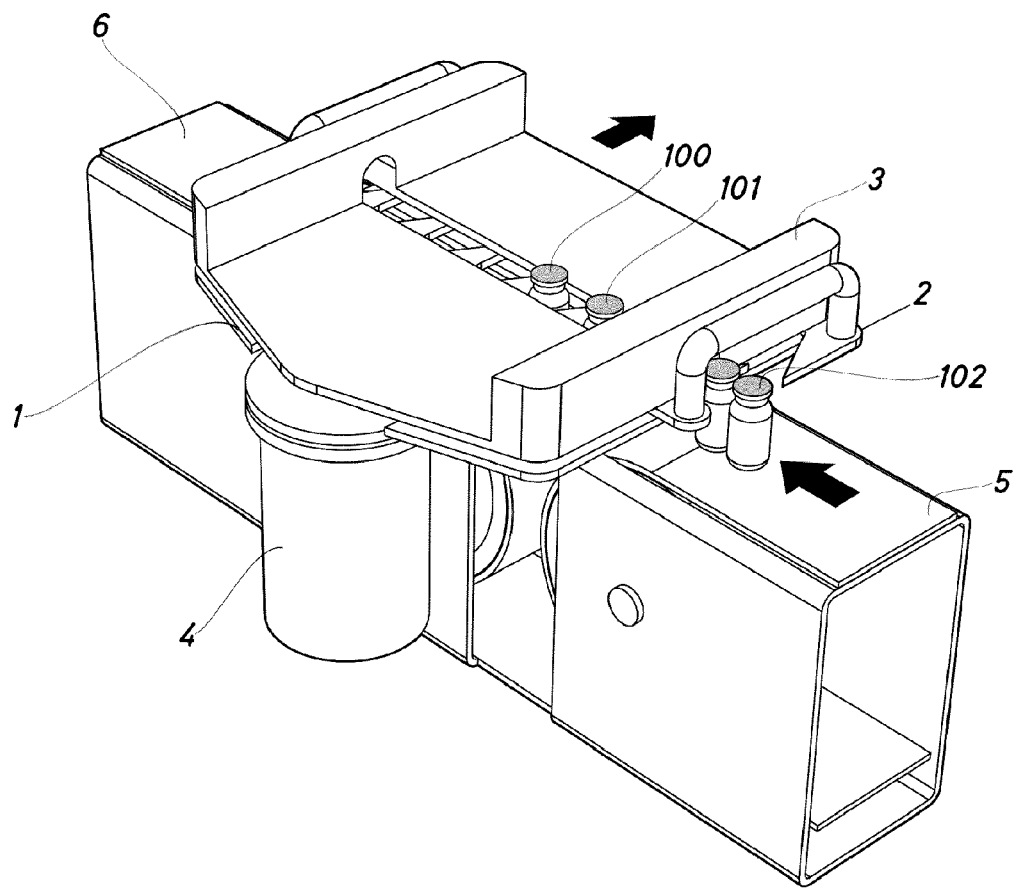
FIG. 2 shows another perspective view of the transfer device of FIG. 1, after some functioning.
Figure 3:
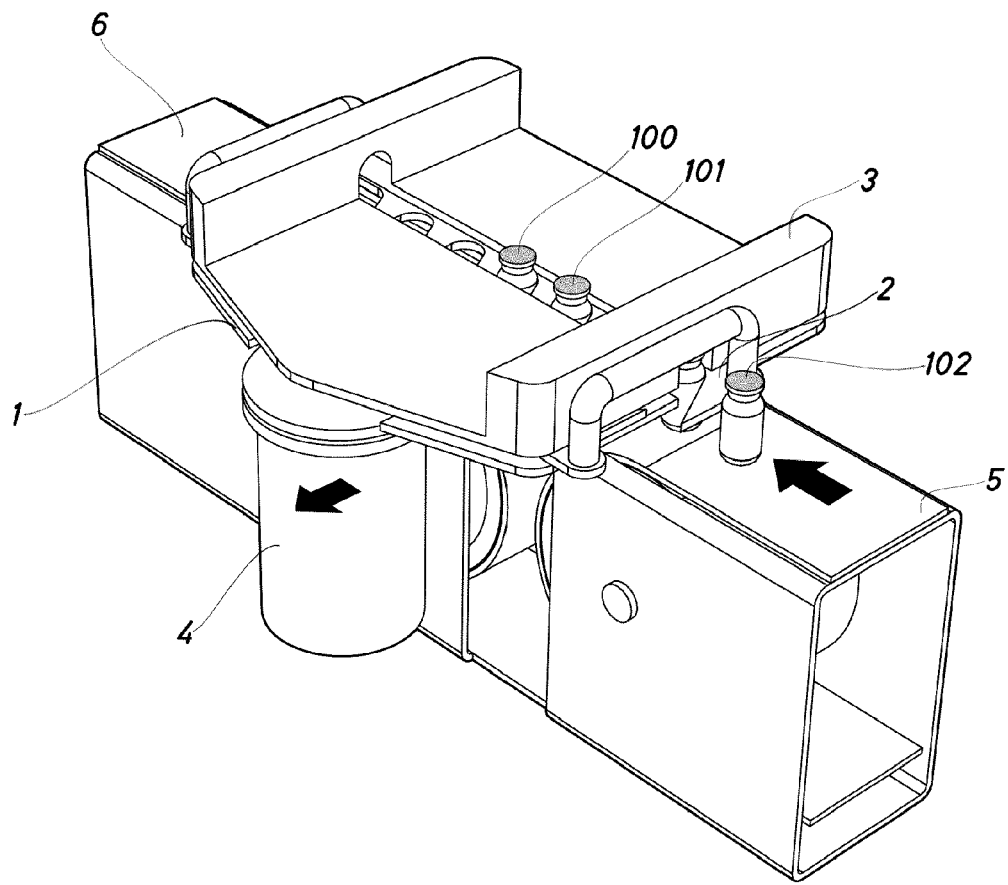
FIG. 3 shows another further perspective view of the transfer device of FIG. 1, after some further functioning.

As it is seen in FIGS. 1-3, the reciprocating motion of the intermediate, second plate 2 produces the movement of the bottles 100, 101, 102 along the path defined by the fixed first and third plates.

Figure 4:
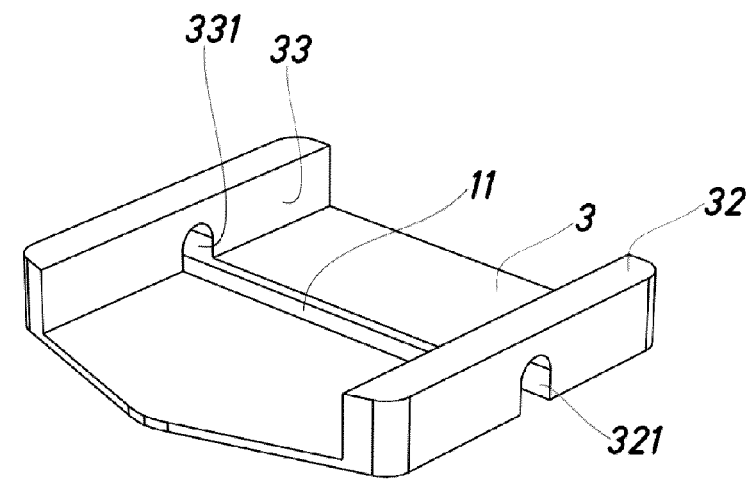
FIG. 4 shows a exploded perspective view of the plates which define the guides of the transfer device.
Figure 4:
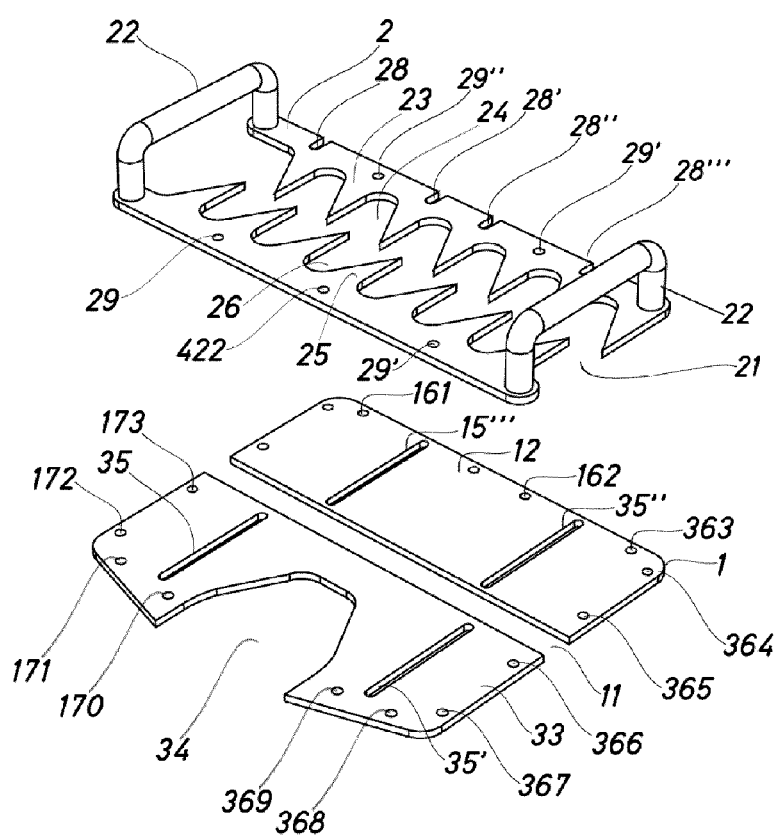

In FIG. 4 the details of the first, second and third plates can be seen. The first plate 1 presents a cutout 31 from side to side that acts as a lower guide for containers. It also divides the plate in two zones or pieces, namely a first piece 32 and a second piece 33, one on each side of the cutout 31. Each first and second pieces 32, 33 have two elongated orifices, 35, 35', 35", 35''' acting as guides for the relative movement between the driven, second plate 2 and the fixed, first and second plates 1, 2. The elongated orifices 35, 35', 35" are perpendicular to the cutout 31. The first plate 1 also has several orifices for fixing the first plate to the base, and/or the first plate 1 to the second plate 3.

The second piece also has a recess 34 allowing space for a reciprocating mechanism (not shown in the picture) driving the second plate 2.

Some orifices 361, 362, 363 of the first piece 32 may receive pins or studs (not shown) acting as stops to the movement of the second plate 2. In this regard, they act in collaboration with corresponding recesses 28, 28', 28", 28''' of the second plate 2.

The second plate also has a cutout 21 from side to side, defining a zigzag path that crosses at several points, when the device is in an inactive state, the path defined by the cutout 31 of the first plate 1. The cutout 31 defines multiple, triangular teeth 23, 25 on each side of the path, with a rounded section 24, 26 between consecutive teeth of each side. The second plate also has an orifice 422 for defining a rotatably connection with a reciprocating mechanism of the motor unit (not shown in the figure). The second plate 2 also has orifices for fixing studs or pins which collaborate with the elongated orifices 35, 35', 35", 35''' of the first plate 1 in order to guide the relative movement between the first and second plates 1, 2.

The two parts of the second plate 2 defined on each side of the cutout 21 are connected by elevated bridge pieces 22, thus connecting both parts and allowing the containers to pass through.

The third plate 3 is located above the second plate 2. It is fixed to the first plate. It has a elongated orifice 11 from side to side which coincides with the cutout 31 of the first plate 1. At each end it has wall parts 12, 13, each with a door for allowing containers of different heights to pass through.

Figure 5:
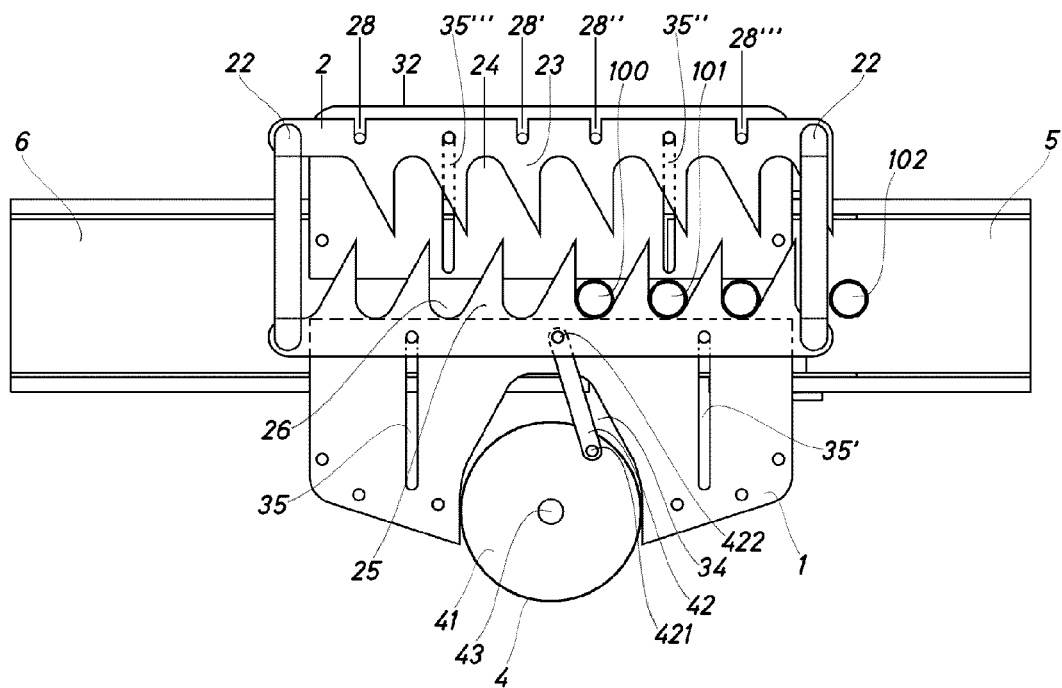
FIG. 5 is a top plan view of the device of FIG. 1, the top plate of the device having been omitted.

FIG. 5 shows the device of FIGS. 1-3 with the top plate 3 removed. The figure shows the reciprocating mechanism which drives the reciprocating motion of the driven, intermediate, second plate 2. The shown reciprocating mechanism consists of an arm 42 rotatably connected by its ends to two orifices 421, 422 in the second plate 2 and in the outer part of a circle piece 41 which is in turn driven by the driving axle 43 of the motor unit 4. The reciprocating mechanism is located in the recess 34 of the second piece of the first plate 1.

Figure 6:
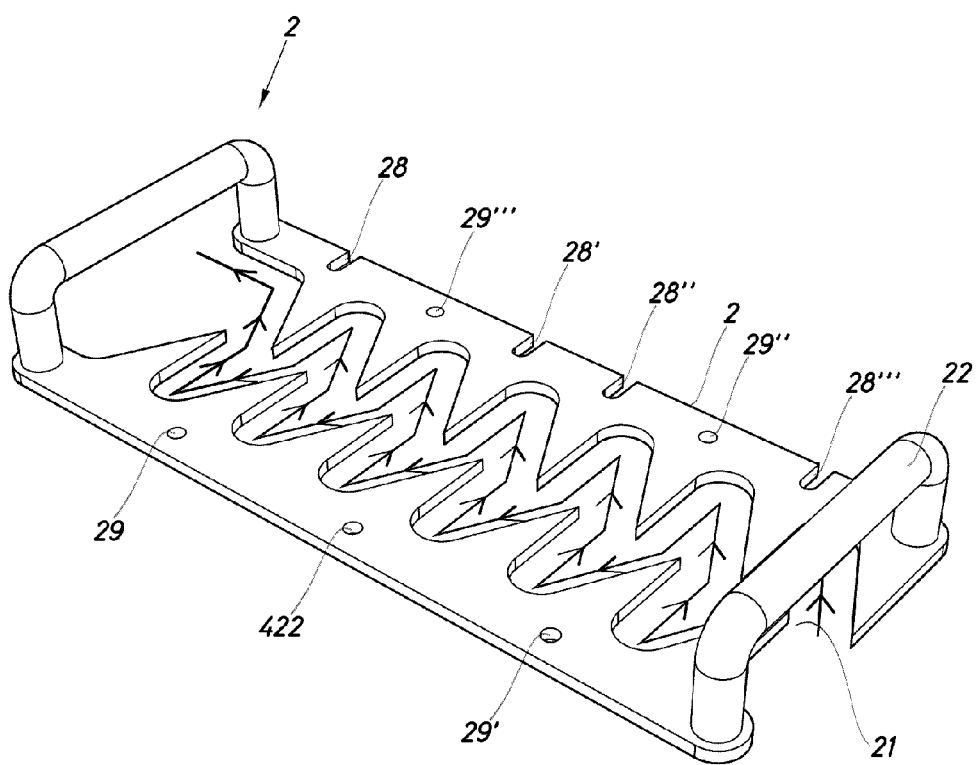
FIG. 6 is a perspective view of the second plate, which contains the second path and is driven by the motor unit, the zigzag second path having been illustrated with an arrowed line.
Figure 7:
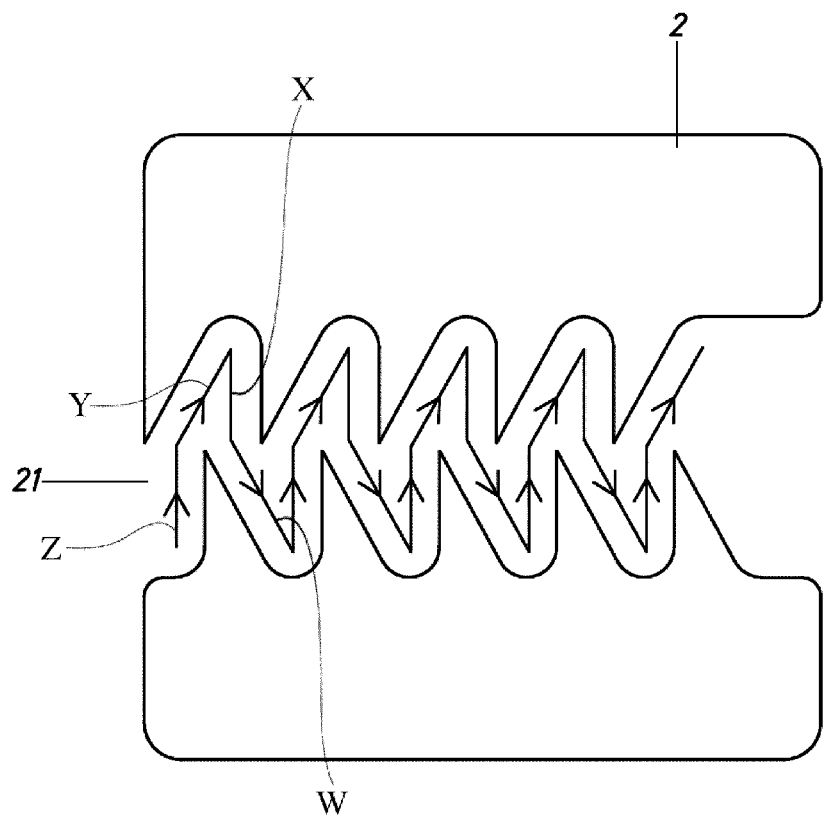
FIG. 7 is a simplified top plan view of a second plate, the zigzag second path having been illustrated with an arrowed line.
Figure 8:
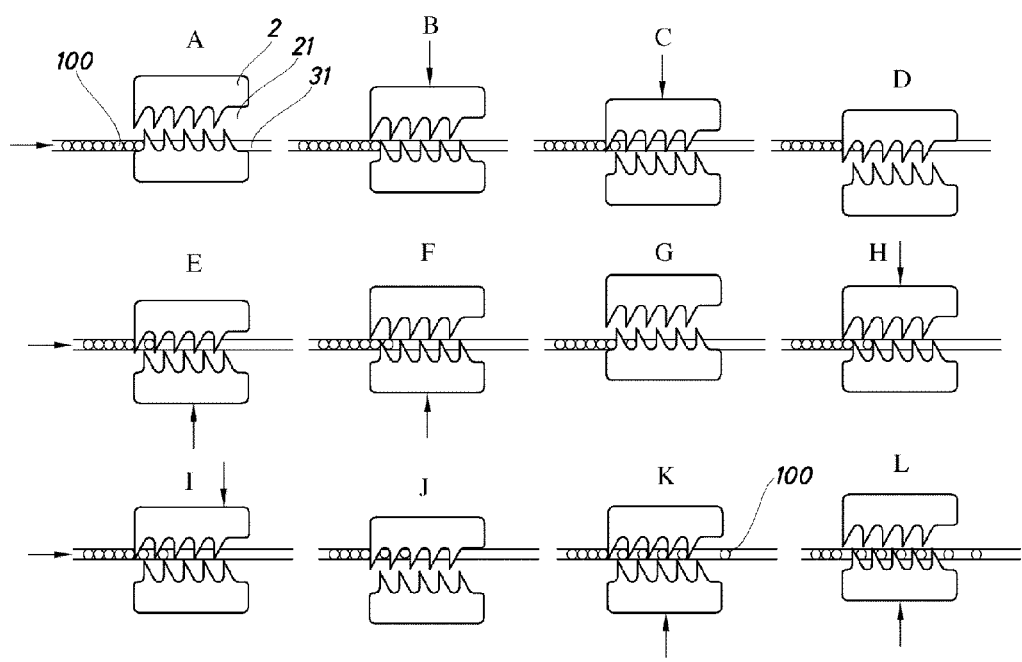
FIG. 8 is a diagram representing the different stages of a process of transfer of a line of containers is shown from a top plan view.

FIGS. 5 and 6 show two different second plates with a similar cutout 21. In both cases, the cutout defines a path which consists of a repeated pattern which in turn consist of a first section Z perpendicular to the straight linear path of the first and second plates followed by a second section Y forming an angle with the first section Z, which in turn is followed by a third section X perpendicular to the straight linear path followed by a fourth section W which forms an angle with said straight path and the second section FIG. 8 shows several stages A-L of the process of transferring bottles 100 from a location on the left of a second plate 2 to its right side. For each stage, the position of the second plate 2 has been represented as well as the position of the path 31 defined by the cutout of the first plate (not shown) The arrows show the direction of the second plate relative to the first plate (and therefore, to the path defined by the cutout 31). Stages which do not present any movement arrow correspond to a change of direction of movement of the second plate in its reciprocating motion. As it can be seen, the bottles 100 are seized by both cutouts 21, 31 of the first and second plates. Therefore, the reciprocating motion between plates and the zigzag design of the cutout of the second plates produces a linear movement of the bottles 100 along the straight linear guide defined by the cutout 31 of the first plate, while the driving unit (second plate) moves exclusively perpendicular to that straight linear guide.

With the design drawings and critical geometry translated into machine tool code, the apparatus according to embodiments of the present invention can be fabricated and assembled by any skilled and qualified machine shop with the appropriate equipment, such as a CNC-controlled laser, plasma, or wire EDM cutting table. The materials of construction can be any conventional flat stock material chosen to be compatible with the desired product application. For pharmaceutical application, Delrin, UHMW and various Nylon grades would be appropriate. Instrumentation, if required, can be as simple as on/off and speed controls.

The design shown requires specific size-format parts for operation with different container sizes but this feature could be considered also an advantage. Once setup is established, there is no adjustment that would affect the reliable and intended operation. This size-format requirement, however, is only specific to container diameter, not height. To circumvent this issue, automated or self-adjusting features can be implemented.

Although the invention has been described with regard to examples of embodiments thereof, said embodiments should not be considered to limit the invention, which will be defined by the widest interpretation of the following claims.

What is claimed is:

1. A device for transferring a container from a first location to a second location, comprising:
    a first container guide defining a first linear path between the first location and the second location, wherein the first linear path is a straight linear path;
    a second container guide defining a second linear path between the first location and the second location, wherein the second linear path is a zig zag path having at least a change in path direction, wherein the second linear path has a first path section perpendicular to first linear path, followed by a second path section oblique to the first linear path, the second path section followed by a third path section perpendicular to the first linear path, followed in turn by a fourth path section forming an angle different to zero to both the first linear path and the second path section; and
    a motor unit configured to create a relative movement between the first guide and the second guide, wherein the motor unit includes a reciprocating device configured to create a reciprocating movement between the first and second container guides, the reciprocating movement being perpendicular to the first linear path.

2. A device according to claim 1, wherein the first container guide and the second container guide are located at different levels of the container to be transferred.

3. A device according to claim 1, wherein the second linear path crosses the first linear path at least once.

4. A device, according to claim 1, wherein the first guide is fixed.

5. A device according to claim 1, the device being a device for transferring round containers.

6. A device, according to claim 5, the device being a device or transferring bottles or vials.

7. A device, according to claim 1, wherein the device further comprises two conveyors for moving a container up to the first location and from the second location away.

8. A device, according to claim 1, the first location belonging to a first zone with a first environmental classification and the second location belonging to a second zone with a second classification different to the first classification.

9. A device, according to claim 1, wherein the first guide is formed by a first fixed plate with a cutout or groove that defines the first path.

10. A device for transferring a container from a first location to a second location, comprising:
    a first container guide defining a first linear path between the first location and the second location;
    a second container guide defining a second linear path between the first location and the second location, the second linear path having at least a change in path direction;
    a third guide which is fixed to the first guide and follows the first linear path, the second guide being located between the first and third guides; and
    a motor unit configured to create a relative movement between the first guide and the second guide.

11. A device for transferring a container from a first location to a second location, comprising:
    a first container guide defining a first linear path between the first location and the second location;
    a second container guide defining a second linear path between the first location and the second location wherein the second linear path has at least a change in path direction, wherein the second guide is formed by a second plate with a cutout which defines the second path, the plate having at least a bridge for joining both parts of the plate on each side of the cutout; and
    a motor unit configured to create a relative movement between the first guide and the second guide.

12. A device, according to claim 11, wherein the cutout is defined on each side by triangular teeth with rounded sections between them, the triangular teeth defining each a tooth apex, the tooth apexes on one side of the cutout being staggered in relation to the tooth apexes of an opposite side of the cutout.

13. A device, according to claim 11, wherein the first guide is formed by a first fixed plate with a cutout or groove that defines the first path and wherein the first fixed plate has grooves or orifices for guiding the relative movement between the first fixed plate and the second plate.

14. A device, according to claim 11, wherein the motor unit has a motor connected to a reciprocating mechanism which is in turn rotatably connected to the second plate, so that the motor unit drives the second plate in a reciprocating movement.

15. A device, according to claim 14, wherein the motor unit is adapted to drive the second plate with a sinusoidal velocity profile.

* * * * *